(12) United States Patent
Peters et al.

(10) Patent No.: US 8,755,976 B2
(45) Date of Patent: Jun. 17, 2014

(54) METHOD AND DEVICE FOR STEERING A SECOND AGRICULTURAL MACHINE, WHICH CAN BE STEERED TO DRIVE OVER A FIELD PARALLEL TO A FIRST AGRICULTURAL MACHINE

(75) Inventors: Ole Peters, Neuenkoogsdeich (DE); Nicolai Tarasinski, Frankenthal (DE); Klaus Hahn, Mannheim (DE); Peter Pickel, Mannheim (DE)

(73) Assignee: Deere & Company, Moline, IL (US)

( * ) Notice: Subject to any disclaimer, the term of this patent is extended or adjusted under 35 U.S.C. 154(b) by 484 days.

(21) Appl. No.: 12/933,649

(22) PCT Filed: Feb. 27, 2009

(86) PCT No.: PCT/EP2009/052387
§ 371 (c)(1),
(2), (4) Date: Sep. 20, 2010

(87) PCT Pub. No.: WO2009/115404
PCT Pub. Date: Sep. 24, 2009

(65) Prior Publication Data
US 2011/0022273 A1 Jan. 27, 2011

(30) Foreign Application Priority Data
Mar. 20, 2008 (DE) .................. 10 2008 015 277

(51) Int. Cl.
*G06F 7/70* (2006.01)
*G06F 19/00* (2011.01)
*G06G 7/00* (2006.01)

(52) U.S. Cl.
USPC ........ 701/50; 701/1; 701/41; 701/42; 701/96; 701/116; 701/466; 382/106; 56/10.1; 56/10.2 R

(58) Field of Classification Search
USPC .................... 701/1, 41, 42, 50, 96, 116, 466; 382/103, 104, 106, 107; 460/114; 414/397; 56/10.1, 10.2 R
See application file for complete search history.

(56) References Cited

U.S. PATENT DOCUMENTS 6,148,255 A * 11/2000 van der Lely .................. 701/50
6,932,554 B2 * 8/2005 Isfort et al. .................... 414/397
(Continued)

FOREIGN PATENT DOCUMENTS

DE 155157 5/1982
DE 19932642 A1 1/2000
(Continued)

OTHER PUBLICATIONS

WIPO International Search Report and Written Opinion mailed May 7, 2009; Application No. PCT/EP09/52387 filed on Feb. 27, 2009; published as WO2009/115404A1 on Sep. 24, 2009; 12 pages.

(Continued)

*Primary Examiner* — Khoi Tran
*Assistant Examiner* — Jaime Figueroa
(74) *Attorney, Agent, or Firm* — Suiter Swantz pc llo

(57) ABSTRACT

The present invention is directed to a device for steering a second agricultural machine which can be steered over a field relative to a first agricultural machine. The device includes a distance meter mounted on one of the machines and operable for recording measured values with regard to direction and distance of objects adjacent to the distance meter over a horizontal region. The device also includes an evaluating means which is connected to the distance meter and is designed to output a steering signal for causing guidance of the second machine relative to the first machine on the basis of the measured values of the distance meter.

17 Claims, 4 Drawing Sheets

(56) References Cited

U.S. PATENT DOCUMENTS

| | | | |
|---|---|---|---|
| 7,537,519 B2 * | 5/2009 | Huster et al. | 460/114 |
| 2003/0145571 A1 * | 8/2003 | Diekhans | 56/10.2 R |
| 2005/0232466 A1 * | 10/2005 | Kampchen et al. | 382/103 |
| 2006/0094487 A1 * | 5/2006 | Huster et al. | 460/114 |
| 2006/0150584 A1 * | 7/2006 | Weiss | 54/10 |

FOREIGN PATENT DOCUMENTS

| | | |
|---|---|---|
| DE | 10064860 A1 | 6/2002 |
| DE | 10064862 A1 | 7/2002 |
| DE | 10224939 A1 | 1/2004 |
| DE | 102004018813 A1 | 2/2006 |
| DE | 102004039460 B3 | 4/2006 |
| EP | 1332659 A2 | 1/2003 |
| JP | 04-101206 | 4/1992 |
| WO | 99/18482 | 4/1999 |

OTHER PUBLICATIONS

"Assistance System for Loading of Farm Materials," by Gero Wallmann and Hans-Heinrich Harms; a German Publication: Landtechnik 57 (2002) Issue No. 6, pp. 352-353; aka German Title: "Assistenzsystem zur Überladung landwirtschaftlicher Güter", [translated as "Assistance system for transferring agricultural products" in the patent application]; 3 pages.

* cited by examiner

METHOD AND DEVICE FOR STEERING A SECOND AGRICULTURAL MACHINE, WHICH CAN BE STEERED TO DRIVE OVER A FIELD PARALLEL TO A FIRST AGRICULTURAL MACHINE

CROSS-REFERENCE TO RELATED APPLICATIONS

The present application is a United States National Phase application which claims priority to International Application No. PCT/EP2009/052387, filed Feb. 27, 2009, which in turn claims priority to German patent application, DE 102008015277.3, filed Mar. 20, 2008, both of which are herein incorporated by reference in their entireties.

FIELD OF THE INVENTION

The present invention relates to the field of agricultural machinery and particularly to a method and device for steering a second agricultural machine, which may be steered to drive over a field parallel to a first agricultural machine.

BACKGROUND OF THE INVENTION

Currently available agricultural machinery may not perform to a desired level.

Thus, it would be desirable to provide a method and device for steering a second agricultural machine, which can be steered to drive over a field parallel to a first agricultural machine.

SUMMARY OF THE INVENTION

Accordingly, an embodiment of the present invention is directed to a device for steering a second agricultural machine which can be steered over a field relative to a first agricultural machine, said device including: a distance meter which is mounted on one of the machines and is configured for being operated to record measured values with regard to direction and distance of objects adjacent to the distance meter over a horizontal region; and an evaluating means which is connected to the distance meter, and is designed to output a steering signal for causing guidance of the second machine relative to the first machine, on the basis of the measured values of the distance meter, characterized in that the evaluating means is configured for being operated, with reference to a plurality of measured values recorded temporally successively by the distance meter, to select from the recorded measured values the measured values which can be assigned to the machine which is not equipped in each case with the distance meter, and to use the selected measured values to generate the steering signal.

An additional embodiment of the present invention is directed to a method for steering a second agricultural machine which is steered over a field relative to a first agricultural machine, said method comprising: recording measured values with regard to the direction and the distance of adjacent objects over a horizontal region by means of a distance meter; outputting a steering signal which brings about guidance of the second machine relative to the first machine and is based on the measured values from the distance meter; and steering the second machine with reference to the steering signal, characterized in that the measured values which can be assigned to the machine which is not equipped with the distance meter are selected from all of the measured values recorded with reference to a plurality of measured values recorded temporally successively by the distance meter, and only the selected measured values are used for generating the steering signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
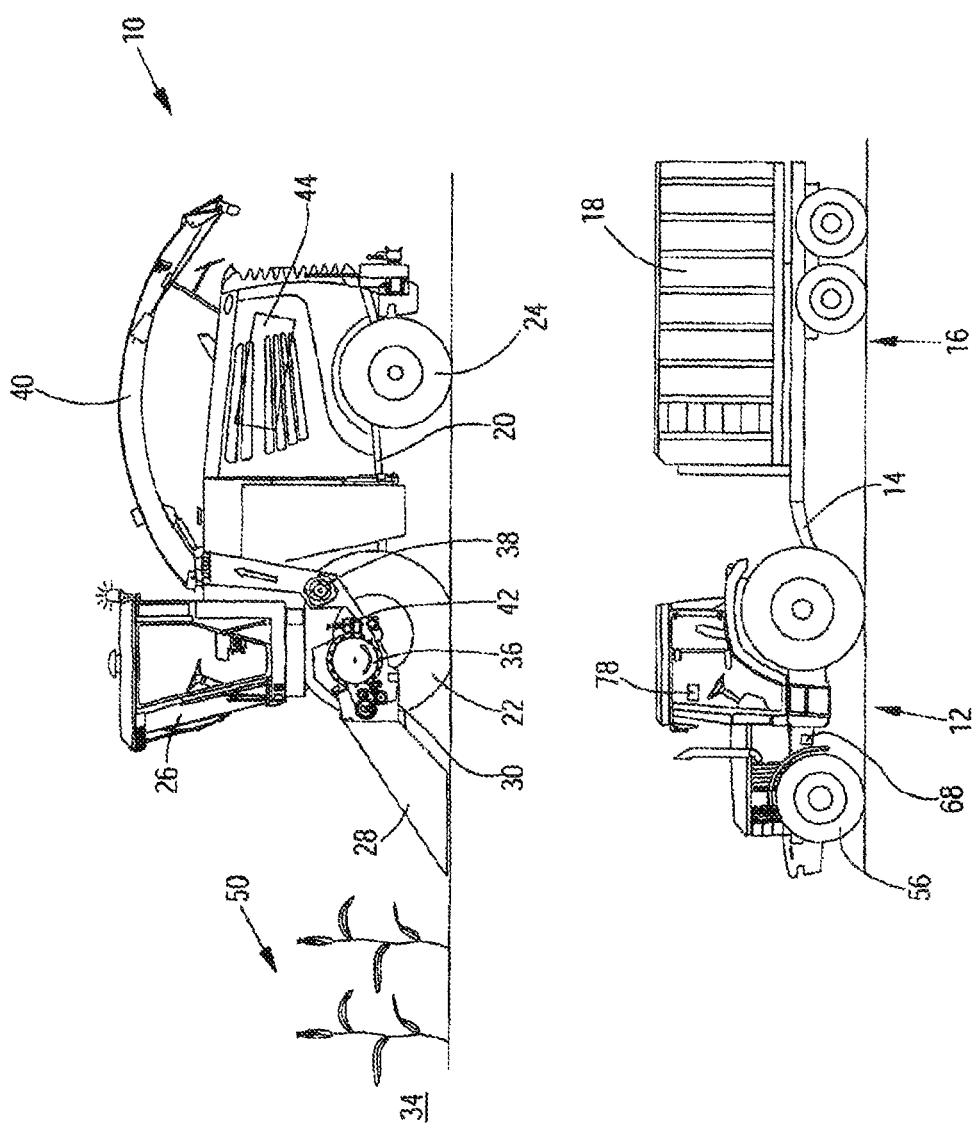
FIG. 1 is a lateral view of a combination of a first and second agricultural machine which is composed of a chopper forage harvester and a tractor with a trailer having a container.

There are many situations in agriculture in which a plurality of machines move independently of one another and parallel to one another when working on a field. Examples include harvesting operations in which the harvested crop is picked up by a self-propelled harvesting machine, processed and transferred to a transport vehicle, harvesting operations carried out by means of a plurality of self-propelled harvesting machines simultaneously to more rapidly harvest larger fields, or other operations in which a plurality of identical or different machines work on a field simultaneously, for example when tilling soil, when ploughing up, manuring and spraying, or when tilling soil immediately after the harvesting operation, with the soil tilling vehicle moving next to a harvesting machine. In order, when transferring the harvested crop, to avoid undesirable losses due to harvested crop dropping on the ground, it is necessary for the transport vehicle to be able to move parallel to the self-propelled harvesting machine. Said parallel movement is also expedient if a plurality of machines are operating simultaneously on the field, in order to avoid working on subsections of the field twice or leaving subsections thereof out.

In the past, the parallel movement took place purely manually by means of the drivers of the machines. The driver of the second machine accordingly has the task of steering said machine parallel to the first machine. The driver of the first machine steers said machine in turn along an existing tilling limit. To relieve the strain on the driver of the first machine, steering aids are known which interact with the tilling limit or the field located in front of the machine in particular mechanically, acoustically (ultrasound) or by means of electromagnetic waves (in particular optically) and automatically steer the first machine.

In order to relieve the strain on the driver of the second machine caused by his steering tasks, at least two types of transmission of steering information from the first machine to the second machine have been proposed. Firstly, steering data in the form of speed and direction data can be transmitted from the first machine to the second machine (see DE 100 64 860 A and JP 04 101 206 A), which has the drawback that any errors in the direction and speed stipulations to the second machine add up over time to large errors in the position, and therefore parallel driving is not always ensured. Secondly, there is the possibility (see G. Wallmann and H. H. Harms, "Assistenzsystem zur Überladung landwirtschaftlicher Güter", [Assistance system for transferring agricultural products], Landtechnik 6/2002, page 352f, DE 100 64 862 A, DE 102 24 939, A, DE 10 2004 039 460 B and WO 99/18482 A) of equipping both machines with a satellite-assisted position recording system, in particular with GPS receivers, and of producing a data transmission connection between the two machines, by means of which the first machine imparts the respective position of the first machine to the second machine. On the basis of said data and the readouts from the position recording system of the second machine, then by finding the difference between the two absolute positions, the relative position is calculated and is used to generate a steering and/or speed signal for the second machine. A drawback of both options is that additional data transmissions have to be provided between the two machines.

A further option described in the prior art for enabling the second machine to move parallel to the first machine consists in using a distance meter on the second machine, the distance meter being based on radar, ultrasound or laser technology and being used to measure the distance from the first machine and to generate a steering signal such that the second machine is automatically steered parallel to the first machine (WO 99/18482 A and DE 102 24 939 A, which is considered as forming the generic type). A problem here is that the distance meter has to be oriented sufficiently precisely with respect to the first machine in order to ensure the operation of said distance meter. It is proposed in DE 102 24 939 A to equip the first machine with special markings with which the distance meter interacts. However, it is costly to apply markings of this type to all of the first machines to be used as a guiding vehicle.

It is known from automobile engineering to record a distance image of a region located in front of the vehicle by means of a laser scanner and to identify the speeds and positions of objects present in said region in order, for example, to be able to rapidly identify pedestrians suddenly emerging behind parking vehicles and then, if appropriate, to be able to react thereto (DE 10 2004 018 813 A). Furthermore, it has been proposed to equip a motor vehicle with a laser scanner which ascertains the distance from a motor vehicle travelling in front, the angle between the two motor vehicles and the relative speed thereof in order to automatically adapt the speed of the following motor vehicle to the speed of the motor vehicle traveling in front (DE 199 32 642 A).

A device and a method for reliably steering a second machine which is steered parallel to a first machine on the basis of signals from a distance meter is disclosed herein.

A device serves to steer a second agricultural machine which moves over a field relative to a first agricultural machine, in particular parallel thereto. A distance meter is mounted on one of the machines and outputs values measured over a horizontally extending region, said measured values each containing information about the direction and the associated distance from recorded objects adjacent to the distance meter and therefore to the machine bearing the latter, i.e. presenting a two-dimensional, horizontally extending "distance image". The measured values are fed to evaluating means which processes them and identifies measured values belonging to the machine not equipped with the distance meter by comparing measured values recorded temporally successively. For example, distance values which belong to a certain direction and remain temporally identical or only change slightly can be assigned to the other machine.

With reference to the recorded measured values, the evaluating means therefore automatically identifies the measured values to be assigned to the machine which is not equipped with the distance meter. Only said selected measured values are used to generate the steering signal. As a result, the second machine always moves in a desired manner—in particular parallel—next to the first machine.

This obviates the need for measures, such as applying special markings to the first machine and adjusting the distance meter, which have been carried out hitherto in order to ensure that said distance meter actually records the first machine. The device according to the invention also operates sufficiently reliably in the rough agricultural surroundings in which it is exposed to vibrations and sight obstructions due to harvested crop particles and the like in the air, since a plurality of distances rather than just a single distance is recorded over a horizontal region, and therefore individual, unusable distance values can be ignored.

It is appropriate to mount the distance meter on the second machine. However, the other alternative would also be conceivable, in which the distance meter is mounted on the first machine and the measured values therefrom or a steering signal derived from the latter is transmitted to the second machine, for example by radio or via optical data transmission means.

In a preferred embodiment of the invention, the evaluating means identifies different objects which are adjacent to the machine equipped with the distance meter. In this connection, reference is made to the disclosure in DE 10 2004 018 813 A which is hereby incorporated into the present document by reference. Measured values from the distance meter representing a common object are accordingly identified, this being easily possible with reference to distances which are virtually independent of the direction or do not change abruptly, and are assigned to the respective object. The objects can then be divided into classes as a function of whether said objects move relative to the machine equipped with the distance meter, or do not. An object which is only moving slightly, if at all, with respect to the machine equipped with the distance meter and which also lies within an anticipated distance region is expediently identified or classified as the machine which is not equipped with the distance meter. Furthermore, with reference to the distance and direction values which are recorded successively in each case by the distance meter, the lateral offset of the objects with respect to the machine equipped with the distance meter, the offset of the objects with respect to the agricultural machine equipped with the distance meter in the forward direction of said objects, and/or the direction of movement of the objects can be identified.

The recorded distance values can be compared with a desired value for the distance in the transverse direction between the two machines and the difference can be fed as a steering signal to a steering means of the second machine (or to a display means or the like, with reference to which the operator of the second machine can steer the latter).

Furthermore, the direction of movement of the second machine with respect to the first machine (or vice versa) can be determined with reference to the measured values. Said direction of movement can additionally serve to generate the steering signal of the second machine in order to be able to more rapidly follow any changes in direction of the first machine. For this purpose, the recorded direction of movement of the machine not equipped with the distance meter can be compared with the direction of movement of the machine equipped with the distance meter and the steering signal is generated in such a manner that the direction of movement of the second machine is at least virtually identical to the direction of movement of the first machine or—if not moving in parallel, for example around curves or in the headland—corresponds to a desired value. Comparison of the directions of movement of the two machines is advantageous in particular if the second machine is ahead of the first machine, since then allowing for the deviation in direction permits a better steering performance of the second machine.

Furthermore, the device according to the invention is also suitable for recording the offset between the first machine and the second machine in the forward direction thereof, since the device can ascertain, for example, the direction of a leading edge and/or of a trailing edge of the machine not equipped with the distance meter. It is appropriate to compare said measured value with a desired value and, with reference to the difference, to activate a speed-stipulating means of the second machine in such a manner that the offset between the two machines in the forward direction thereof always remains at least virtually identical and in particular corresponds to the desired value.

The desired value for the distance in the transverse direction between the two machines can be retrievable from a memory means as a constant. A desired value which is retrievable from the memory means may also be changeable by the operator or input into the memory means by said operator. In a preferred embodiment, an operator can bring the second machine into a desired position with respect to the second machine and, by means of a suitable input into an input means, can cause the current distance to be adopted as the desired value by the evaluating means.

The orientation of the distance meter with respect to the machine bearing said distance meter may be variable in order to be able to adapt said orientation to different tasks. There are situations in which the second machine moves offset forward with respect to the first machine, for example when transferring harvested crop, and therefore the sensitive region of the distance meter has to be directed obliquely to the rear (or obliquely to the front, if the distance meter is mounted on the first machine) while, in other situations, the two machines move precisely next to each other, i.e. during tilling of the soil, and therefore the sensitive region of the distance meter has to be directed toward the side.

The distance meter can scan the horizontal region by sweeping over a suitable angular range around the vertical axis, or can simultaneously record said region by means of a plurality of individual distance meters which are sensitive to different angles or are arranged consecutively at suitable distances. Furthermore, it should be noted that the distance meter can record a region not only in the horizontal direction but additionally also in the vertical direction in order to provide a three-dimensional distance image, the evaluation of which permits a more precise determination of the distance from the second machine, or a determination which is decoupled from possible movements of the second machine about the axis extending in the forward direction.

Within the context of the concept of the invention, different embodiments are suitable for the distance meter. For example, a radar sensor is used which radiates successive electromagnetic waves in different directions and records the distance of the objects with reference to the propagating time of reflected waves. Analogously, use could be made of an ultrasound sensor which radiates acoustic waves and identifies the distance of the objects with reference to the propagating time of recorded, reflected waves. In order to obtain distance values for different horizontal directions, use may be made of a plurality of ultrasound sensors offset in angle about the vertical axis, or a single ultrasound sensor rotates about the vertical axis. Furthermore, a laser scanner can be used as the distance meter, said laser scanner being rotated about the vertical axis and successively radiating light, which is in the visible wavelength range or thereabove (ultraviolet) or therebelow (infrared), in different directions. The distance of the object is evaluated with reference to the propagating time and/or beam expansion of recorded light reflected by an object. It would also be possible to use a plurality of lasers which emit beams in different directions and radiate the light simultaneously or successively.

It is furthermore proposed that the evaluation means can be operated to generate a signal for avoiding collision of adjacent objects with reference to the selected measured values from the distance meter. Said signal may be a steering signal to circumnavigate the object, or it is a stopping signal for automatically stopping the advance of the second machine.

It is also possible to use the evaluating means in order to identify a configuration of the first agricultural machine with reference to the measured values from the distance meter and to draw a conclusion therefrom concerning a permitted and/or preferred direction and distance region of the first agricultural machine with respect to the second agricultural machine. For example, a conclusion can be drawn concerning the distance to be maintained with reference to the size, in particular the width, of the first machine or of the harvesting attachment thereof.

The device according to the invention is suitable for any combinations of agricultural machines. For example, the first machine is a harvesting machine and the second machine is a transport vehicle suitable for the transfer and for transporting away the harvested crop harvested by the first machine, or the second machine is a transport vehicle and the first machine is or pulls a sowing machine for the transfer of seeds. In another embodiment, the two machines are identical harvesting machines moving, for example, offset or precisely next to one another or are machines moving offset or precisely next to one another for tilling the soil or for ploughing up, manuring or spraying. The two machines may also be different, for example if one soil tilling machine moves laterally offset and precisely next to or in front of or behind a harvesting machine.

Reference will now be made in detail to the presently preferred embodiments of the invention, examples of which are illustrated in the accompanying drawings.

A combination of two agricultural machines that is illustrated in FIG. 1 comprises a self-propelled chopper forage harvester 10, which constitutes a first agricultural machine, a self-propelled tractor 12, which constitutes a second agricultural machine, and a trailer 16 which is pulled by the tractor 12 by means of a drawbar 14 and comprises a container 18.

The self-propelled chopper forage harvester 10 is constructed on a frame 20 which is carried by front driven wheels 22 and steerable rear wheels 24. The chopper forage harvester 10 is operated from a driver cab 26 from which a harvesting attachment 28 in the form of a corn-mowing attachment is visible, said harvesting attachment being fastened to a draw-in channel 30 on the front side of the chopper forage harvester 10. Harvested crop picked up from a field 34 by means of the harvesting attachment 28 is fed via a draw-in conveyor, which is arranged in the draw-in channel 30 and has initial compression rollers, to a forage chopping cylinder 36 which chops said harvested crop into small pieces and feeds it to a blower 38. The crop leaves the chopper forage harvester 10 for the trailer 16 moving alongside via a discharging means 40 in the form of an ejection spout which is rotatable about an approximately vertical axis and is adjustable in inclination. A regrinding device 42 with two grain processor rollers extends between the forage chopping cylinder 36 and the blower 38. The abovementioned, drivable assemblies of the chopper forage harvester 10 and harvesting attachment 28 are driven by means of a combustion engine 44. The tractor 12 and the trailer 16 are of conventional construction and accordingly do not need to be discussed further.

Figure 2:
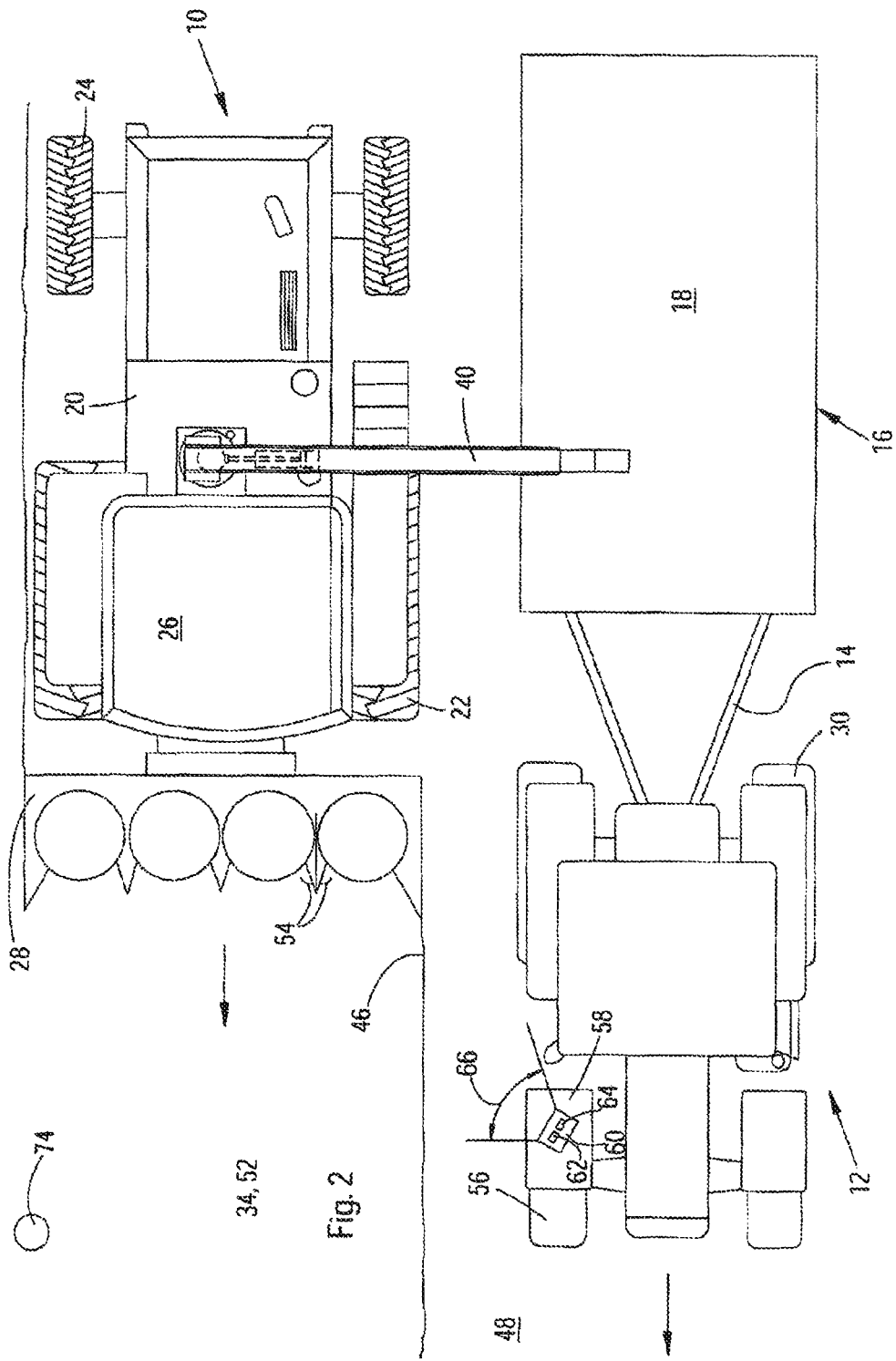
FIG. 2 is a top view of the combination shown in FIG. 1.

In FIG. 2, the combination of the two machines 10, 12 is reproduced in a top view. It can be seen that the chopper forage harvester 10 moves along a harvested crop edge 46 which constitutes a boundary between the harvested region 48 of the field 34 and the crop area 52 of the field 34 that is still standing and is occupied by corn plants 50. The driver of the chopper forage harvester 10 steers the latter by hand along the harvested crop edge 46, or the chopper forage harvester 10 is automatically steered along the harvested crop edge 46 by means of a row sensor which comprises two probes 54 mounted on a separating tip of the harvesting attachment and guides the chopper forage harvester 10 along the plants 50 which stand in rows.

Figure 3:
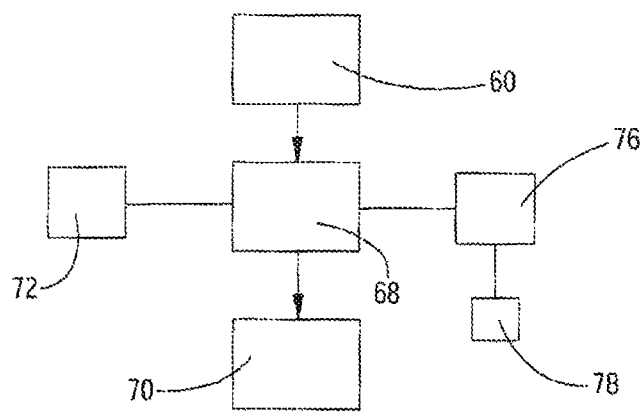
FIG. 3 shows a schematic diagram in which the automatic steering means of the second machine is illustrated.

In order to relieve the strain on the driver of the tractor 12 caused by his steering tasks, a distance meter 60 is arranged on a fender 58 of the tractor 12 above a steerable front wheel 56, said distance meter being a laser scanner in the embodiment illustrated. The distance meter comprises a pulsed laser 62 which operates in the visible wavelength range or thereabove or therebelow and radiates the light therefrom in a focused manner in the horizontal direction, and a light sensor 64 which is sensitive to the light of the laser 62 and ascertains the respective distance of the objects from the distance meter 60 with reference to the propagating time of the light originating from the laser 62 and reflected by objects which may be positioned next to the tractor 12 (and/or with reference to an angular expansion of the light which is dependent on the distance away from the object). The laser 62 and preferably, but not necessarily, the light sensor 64 are rotated successively about the vertical axis by a motor (not shown) in order to gradually scan an angular range 66 within a certain, sufficiently short time. The distance meter 60 is mounted at a height in which it sees over the standing plants 50. In order to avoid erroneous measurements when travelling over unevennesses in the ground, an automatic, horizontal orientation of the distance meter 60 can be provided. In addition, the distance meter 60 can be height-adjustable (in each case manually or by motor), for example for adaptation to the height of the plants 50, and/or can be rotatable as a whole about the vertical axis in order to adapt the position of the angular range 66 swept over to the respective operating task of the tractor 12. If, for example, two tractors travel next to each other during the tilling of the soil or when mowing, the distance meter 60 is rotated forward by hand or by a motor such that the center of the angular range 66 extends transversely to the forward direction of the tractor 12. The distance meter 60 may be rotated even further forward in order to record a processing limit of the field 34, for example when tilling the soil or when mowing or harvesting. As illustrated graphically in FIG. 3, an output of the distance meter 60 is connected to an evaluation means 68 which, in turn, is coupled to a steering means 70 and to a speed-stipulating means of the tractor 12.

Figure 4:
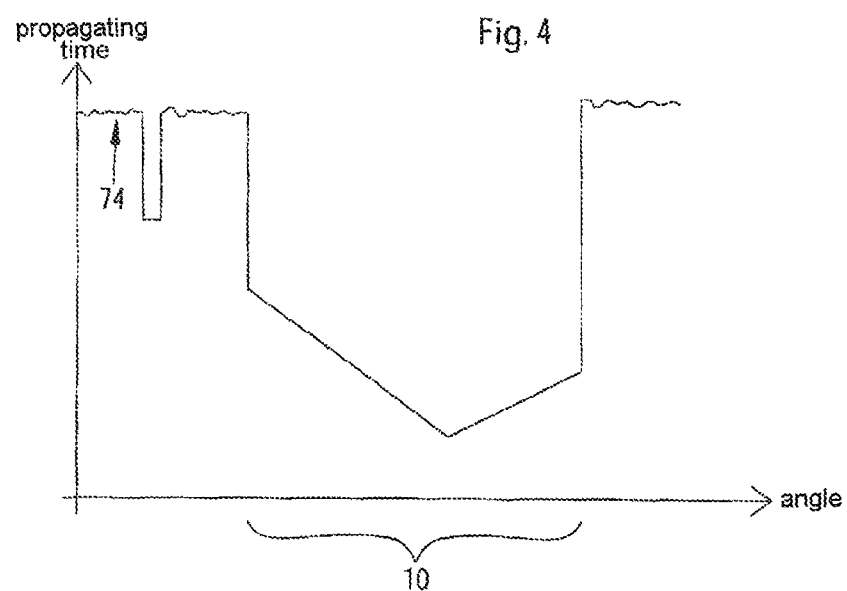
FIG. 4 shows an example of a two-dimensional distance image which is output by the distance meter and is assigned to the situation from FIG. 1 and FIG. 2.

FIG. 4 reproduces a typical, two-dimensional distance image as transferred from the distance meter 60 to the evaluating means in the situation according to FIG. 2. The angle of the distance meter about the vertical axis is plotted on the X-axis and the propagating time of the light is plotted on the Y-axis. The evaluation means 68 therefore obtains measured values from the distance meter, which contain information about the direction (angle about the vertical axis) and the associated propagating time of the light (or the associated distance of the object obtained by multiplying the propagating time with half the speed of light). In the case illustrated, first of all a relatively high propagating time should be anticipated with a rising angle—in the clockwise direction, i.e. from left to right in the top view according to FIG. 2—since no objects are present. A first dropping of the propagating time is caused by a pylori 74, after which the propagating time increases again, and drops continuously when the distance meter 60 records the chopper forage harvester 10. At the rear edge thereof, the propagating time increases again. The evaluation means 68 uses a plurality of distance images recorded temporally successively in order to identify the measured values which can be assigned to the chopper forage harvester 10 and to use said measured values to generate a steering signal for the steering means 70 and a speed-stipulating signal for the speed-stipulating means 72. In the next distance image, only the propagating time drop, which can be assigned to the pylori 74, would migrate to the right while the measured values with regard to direction and distance, which values can be assigned to the chopper forage harvester 10, remain approximately the same as long as the two machines 10, 12 move at the same speed and parallel to each other.

Figure 5:
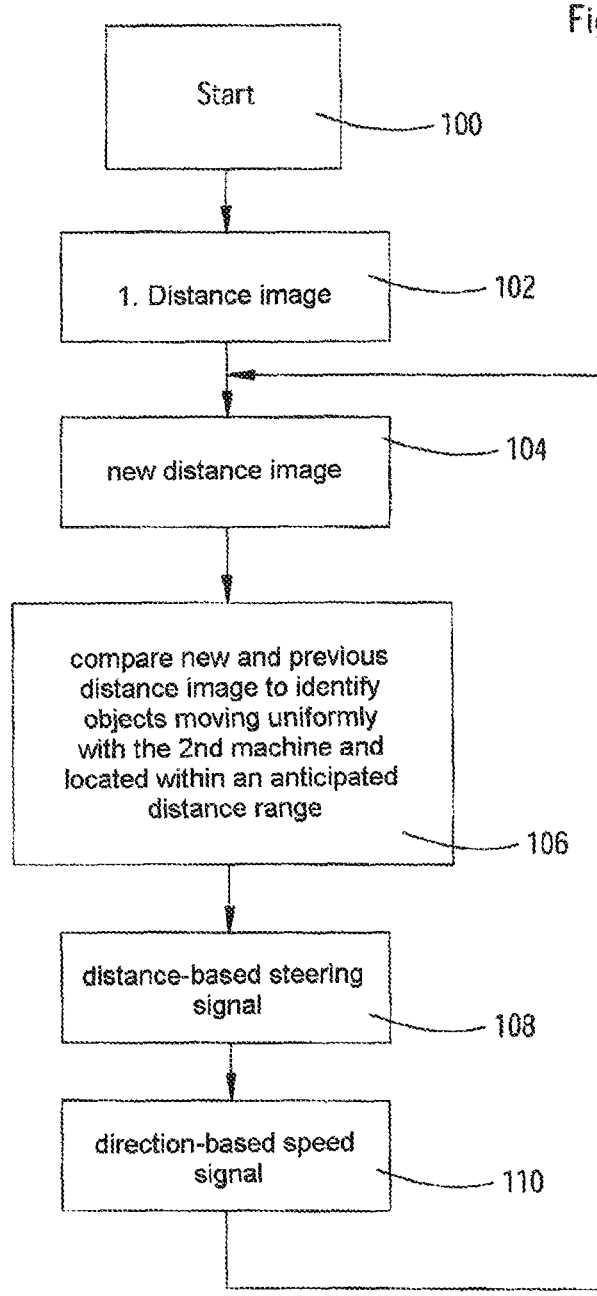
FIG. 5 shows a flow diagram according to which the evaluation means operates.

This fact is used by the evaluation means 68, as can be seen with reference to the flow diagram which is illustrated in FIG. 5 and in accordance with which the evaluation means 68 operates. After the start (step 100), first of all (step 102) a first distance image is taken, as illustrated by way of example in FIG. 4. A further step (104) then follows, in which a further distance image is taken. In the following step (106), the distance image taken last and the distance image taken previously are compared in order to identify the objects adjacent to the tractor 12. In this case, for example, the pylori 74 is identified as a fixed object which moves relative to the tractor 12, specifically at the current advancing speed of the tractor 12, which speed can be fed to the evaluation means 68 as further information. The chopper forage harvester 10 is identified as an object which is moving only relatively slightly, if at all, with respect to the tractor 12.

In step 108, the evaluation means 68, with reference to the distance values assigned to the chopper forage harvester 10, then generates a steering signal for the steering means 70 which, in turn, steers the steerable front wheels of the tractor 56. For this purpose, the evaluation means 68 compares said distance values with a desired value, which is retrieved from a memory means 76, and generates the steering signal with reference to a difference between the desired value and a distance value, for example the smallest recorded distance value between the chopper forage harvester 10 and the tractor 12 and the trailer 16. Said distance value can be corrected with regard to the particular angle at which it was recorded in order to compensate for the effects of geometry caused by an offset of the tractor 12 in the forward direction with respect to the chopper forage harvester 10 and in order only to take into consideration the shortest distance, as measured transversely with respect to the forward direction, between the tractor 12 or trailer 16 and the chopper forage harvester 10. The desired value can be firmly specified in the memory means 76 or can be input and/or changed by means of an operator input means 78 arranged at the operator's work station on the tractor 12. A key or the like of the operator input means 78 can also be depressed in order to adopt a current distance between the tractor 12 or trailer 16 and the chopper forage harvester 10 as the desired value.

In step 108, the forward direction of the first machine 10 can also be recorded and used to correct the steering signal, the correction taking place by comparing two distance images following temporally consecutively. It can be foreseen as a result whether the first machine 10 is still moving in the same direction as the second machine 12 or not and, if appropriate, the steering signal can be corrected to the effect that, after possible changes in direction of the first machine 10, the second machine 12 more rapidly follows the first machine 10 than if it were merely attempted to keep the lateral distance between the two machines 10, 12 constant.

In addition, in step 110, the evaluation means 68 generates a speed signal for the speed-stipulating means 72, which speed signal is based on the measured position of the chopper forage harvester 10 with respect to the tractor 12 in the forward direction and is selected in such a manner that said distance corresponds to a desired value. The desired value can be firmly specified in the storage means 76 or can be input and/or changed by means of an operator input means 78 arranged at the operator's work station on the tractor 12. A key or the like of the operator input means 78 can also be depressed in order to adopt a current distance between the tractor 12 or trailer 16 and the chopper forage harvester 10 as the desired value. Step 110 is followed again by step 104. In the next step 106, the two most recent distance images are then compared again.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A device for steering a second agricultural machine which can be steered over a field relative to a first agricultural machine, the device comprising:
   a distance meter which is mounted on the second agricultural machine and is configured for being operated to record measured values with regard to direction and distance of one or more objects adjacent to the distance meter over a horizontal region, said measured values being derived from detected propagation times of signals transmitted and received by the distance meter; and
   an evaluating means which is connected to the distance meter, and is designed to output a steering signal for causing guidance of the second agricultural machine relative to the first agricultural machine, on the basis of the measured values of the distance meter,
   where the evaluating means is configured for being operated, with reference to a plurality of measured values recorded temporally successively by the distance meter, to select from the recorded measured values the measured values which can be assigned to the first agricultural machine, the measured values assigned to the first agricultural machine being derived from detected propagation times of signals transmitted and received by the distance meter that are substantially consistent over a course of motion of the first agricultural machine and the second agricultural machine,
   where the evaluating means is further configured for being operated to use the measured values assigned to the first agricultural machine to generate the steering signal for the second agricultural machine, and
   where the evaluating means is further configured for being operated to select from the recorded measured values the measured values which can be assigned to one or more different objects which are adjacent to the second agricultural machine, the measured values assigned to the one or more different objects being derived from detected propagation times of signals transmitted and received by the distance meter that are inconsistent over the course of motion of the first agricultural machine and the second agricultural machine.

2. The device as claimed in claim 1, characterized in that the evaluating means can be operated to identify the objects and/or the lateral offset thereof with respect to the distance meter and/or the offset thereof with respect to the in the forward direction and/or direction of movement thereof with respect to the distance meter with reference to the values, which are successively recorded in each case by the distance meter, for the distance and the direction.

3. The device as claimed in claim 2, characterized in that the evaluating means can be operated to divide the objects to objects moving with respect to the with respect to the distance meter and objects which are stationary with respect to the distance meter or are only moving slightly.

4. The device as claimed in claim 3, characterized in that evaluating means can be operated to classify an object which is only moving slightly, if at all, with respect to the distance meter and/or is located within an anticipated distance range as the machine which is not equipped with the distance meter.

5. The device as claimed in one of claim 1, characterized in that the evaluating means is designed to generate the steering signal in such a manner that the offset between the first machine and the second machine remains at least virtually the same in the lateral direction or corresponds to a desired value and/or has the effect that the direction of movement of the second machine is at least virtually identical to the first machine or corresponds to a desired value.

6. The device as claimed in claim 1, characterized in that the evaluating means is furthermore designed to provide a speed signal which can be supplied to a speed-stipulating means of the second machine and has the effect that the offset between the first machine and the second machine in the forward direction thereof remains at least virtually the same or corresponds to a desired value.

7. The device as claimed in claim 1, characterized in that the evaluating means can be supplied with a desired value for the distance value, which can be retrieved from a memory means as a constant or as a value which can be input and/or changed by an operator, and/or can be selected by confirmation of a respectively current distance value recorded by the distance meter.

8. The device as claimed in claim 1, characterized in that the orientation of the distance meter can be changed.

9. The device as claimed in claim 1, characterized in that the distance meter scans the region or comprises a plurality of distance meters which are sensitive in different directions.

10. The device as claimed in claim 9, characterized in that the distance meter comprises a laser scanner.

11. The device as claimed in claim 1, characterized in that the evaluating means is connected to a steering means of the second machine.

12. The device as claimed in claim 1, characterized in that the evaluating means can be operated to steer the second machine to drive parallel to the first machine.

13. The device as claimed in claim 1, characterized in that the evaluating means can be operated to identify a configuration of the first agricultural machine with reference to the measured values and to draw a conclusion therefrom regarding a permitted and/or preferred region of direction and distance of the first agricultural machine from the second agricultural machine.

14. A combination of a first agricultural machine, a second agricultural machine and a device as claimed in one of the preceding claims.

15. A method for steering a second agricultural machine which is steered over a field relative to a first agricultural machine, said method comprising:

recording measured values with regard to the direction and the distance of one or more adjacent objects over a horizontal region by means of a distance meter mounted on the second agricultural machine, said measured values being derived from detected propagation times of signals transmitted and received by the distance meter;

outputting a steering signal which brings about guidance of the second agricultural machine relative to the first agricultural machine and is based on the measured values from the distance meter; and steering the second agricultural machine with reference to the steering signal, where measured values which can be assigned to the first agricultural machine are selected from all of the measured values recorded with reference to a plurality of measured values recorded temporally successively by the distance meter, the measured values assigned to the first agricultural machine being derived from detected propagation times of signals transmitted and received by the distance meter that are substantially consistent over a course of motion of the first agricultural machine and the second agricultural machine, where the measured values assigned to the first agricultural machine are used for generating the steering signal, and where measured values which can be assigned to one or more different objects are selected from all of the measured values to identify the one or more different objects which are adjacent to the second agricultural machine, the measured values assigned to the one or more different objects being derived from detected propagation times of signals transmitted and received by the distance meter that are inconsistent over the course of motion of the first agricultural machine and the second agricultural machine.

16. The device according to claim 1, wherein the one or more objects comprises one or more of the following: the first agricultural machine, and the one or more different objects other than the first agricultural machine.

17. The device according to claim 16, where the evaluating means is further configured for being operated, with reference to the plurality of measured values recorded temporally successively by the distance meter, to generate a signal for avoiding collision between the second agricultural machine and the one or more objects.

* * * * *